(12) United States Patent
Smith et al.

(10) Patent No.: US 6,854,651 B2
(45) Date of Patent: Feb. 15, 2005

(54) NON-PERSISTENTLY DISPLAYED BAR CODE BASED DATA INPUT METHOD AND APPARATUS

(75) Inventors: Cindy M. Smith, Bellevue, WA (US); Peter Zatloukal, Duvall, WA (US)

(73) Assignee: Wildseed Ltd., Kirkland, WA (US)

( * ) Notice: Subject to any disclaimer, the term of this patent is extended or adjusted under 35 U.S.C. 154(b) by 0 days.

(21) Appl. No.: 10/187,716

(22) Filed: Jul. 1, 2002

(65) Prior Publication Data

US 2004/0000589 A1 Jan. 1, 2004

(51) Int. Cl.[7] .................................................. G06K 7/10
(52) U.S. Cl. ........................... 235/462.01; 235/462.16; 235/462.45; 235/472.01; 235/487; 235/494
(58) Field of Search ........................ 235/462.01, 462.16, 235/487, 494, 376, 462.45, 472.01

(56) References Cited

U.S. PATENT DOCUMENTS

| | | | | |
|---|---|---|---|---|
| 5,013,895 A | * | 5/1991 | Iggulden et al. | ............ 235/110 |
| 5,153,842 A | * | 10/1992 | Dlugos et al. | ............... 700/227 |
| 5,513,264 A | * | 4/1996 | Wang et al. | .................... 380/51 |
| 6,082,620 A | * | 7/2000 | Bone, Jr. | ................ 235/462.16 |
| 6,454,174 B1 | * | 9/2002 | Sansone | ...................... 235/494 |
| 6,557,755 B1 | * | 5/2003 | Pickering et al. | ........... 235/376 |
| 6,581,829 B2 | * | 6/2003 | Kim | ........................... 235/385 |
| 6,685,093 B2 | * | 2/2004 | Challa et al. | .......... 235/462.46 |

FOREIGN PATENT DOCUMENTS

| | | |
|---|---|---|
| WO | WO 00/03328 A1 | 1/2000 |
| WO | WO 02/06992 A2 | 1/2002 |
| WO | WO 02/07046 A2 | 1/2002 |
| WO | WO 02/07117 A2 | 1/2002 |
| WO | WO 03/27937 A2 | 4/2003 |
| WO | WO 0193120 A1 * | 12/2003 ........... G06F/17/60 |

OTHER PUBLICATIONS

Simonds, Method and System of Effecting a Financial Transaction, Feb. 21, 2002, US2002/0023027A1.*

* cited by examiner

*Primary Examiner*—Steven S. Paik
(74) *Attorney, Agent, or Firm*—Schwabe, Williamson & Wyatt, P.C.

(57) ABSTRACT

A device is equipped with the ability to non-persistently display a data on its display in bar code form on demand, to enable another system to acquire the data by reading the bar code.

26 Claims, 5 Drawing Sheets

NON-PERSISTENTLY DISPLAYED BAR CODE BASED DATA INPUT METHOD AND APPARATUS

FIELD OF THE INVENTION

The present invention relates to the field of data processing. More specifically, the present invention is related to data input methods.

BACKGROUND OF THE INVENTION

With advances in integrated circuit, microprocessor, networking and communication technologies in recent years, increasing number of mobile devices have been developed and adopted by the consumers. Mobile devices are typically compact, and many are palm-sized, to increase the ease of their carriage, thereby allowing their users to carry the mobile devices with them, as they move from places to places. Examples of these mobile devices include, but are not limited to, laptop computers, palm-sized computing devices, personal digital assistants (PDA), pagers, MPx Players and wireless mobile phones.

Increasingly, mobile devices are capable of storing vast quantity of information. Examples of these information, include but are not limited to, names, addresses, phone numbers, and other personal as well as non-personal information. Examples of other personal information include, but are not limited to, driver's license numbers, passport numbers, employee identification numbers, and student identification numbers, whereas examples of non-personal information include, but are not limited to, product identification numbers.

Often times, users of these mobile devices found themselves in situations where they have to provide one or more of these information to other parties. Further, in many of these situations, because of the lack of compatibility communication interfaces between the mobile devices and the equipment of the other parties, the information often has to be provided verbally, with the other parties manually entering the information into their systems. Thus, it would be desirable if mobile devices can be improved to increase the likelihood the information may be provided to the other parties directly from the mobile devices.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1:
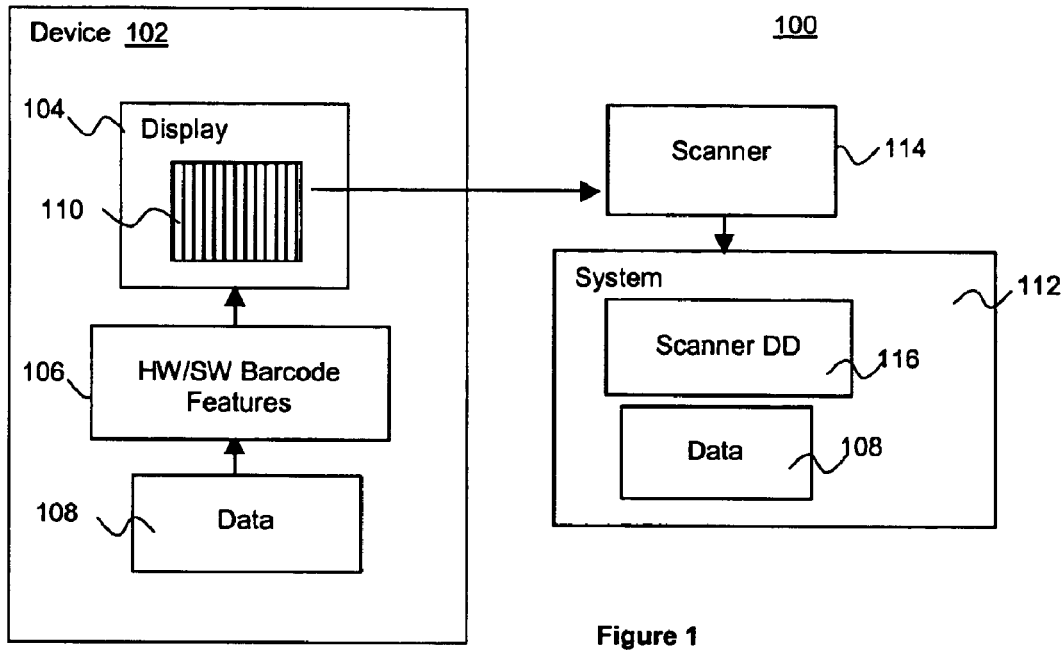
FIG. 1 illustrates an overview of the present invention, in accordance with one embodiment.

The present invention includes a non-persistently displayed bar code based data input method, and devices equipped with hardware and/or software features in support of the practice of the data input method.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Terminology

Parts of the description will be presented in data processing terms, such as data, selection, retrieval, generation, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through electrical and/or optical components of a processor and its subsystems.

Part of the descriptions will employ various abbreviations, including but are not limited to:

| | |
|---|---|
| ASCII | American Standard Character II |
| CDROM | Compact Disc Read Only Memory |
| DDRAM | Dynamic Direct Random Access Memory |
| DVD | Digital Versatile Disc |
| EAN | European Article Numbering |
| EEPROM | Electrically Eraseable Programmable Read-Only-Memory |
| IEEE | Institute of Electrical and Electronic Engineers |
| Postnet | POSTal Numerical Encoding Technique |
| SDRAM | Static Direct Random Access Memory |
| TFT | Thin Film Transistor |
| UPC | Uniform Product Coding |

The term "mobile" as used in this application to describe a device, including both its usage in the specification and the claims, refers to the "mobility" of the device as seen from the perspective of reading a non-persistently display bar code on a display of the device. Typically, for a mobile device, the displayed bar code may be read by moving the device (with the displayed bar code) over a stationery scanner, whereas for an immobile device, the displayed bar code is typically read by moving a hand held scanner over the display of the device.

The terms "alpha" or "alphanumeric" as used in this application to describe a character set, including both its usage in the specification and the claims, refers to a character set that may include "special" characters, such as punctuations, in addition to the alphabets of an alphabet based language.

The term "number" as used in this application to describe a data, including both its usage in the specification and the claims, typically refers to numeric data, as the word "number" is conventionally used in mathematics. However, in certain contexts, the "number" may also include alphabet or special characters, as the term is conventionally understood by those skilled in the art in those contexts. For examples, a driver's license number, a passport number, an employee number, or a student ID number, as each of these terms is conventionally used, often includes one or more alphabets or special characters, even though they are referred to as "numbers". The term accordingly is to be given the meaning that is consistent with the context under which the term is used.

Section Headings, Order of Descriptions and Embodiments

Section headings are merely employed to improve readability, and they are not to be construed to restrict or narrow the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Overview

We refer now to FIG. 1, wherein a block diagram illustrating an overview of the present invention, in accordance with one embodiment, is shown. As illustrated, in accordance with the present invention, device 102 is advantageously equipped with hardware and/or software features 106 to facilitate provision or transfer of data 108 to system 112. More specifically, device 102 is advantageously equipped with hardware and/or software features 106 to facilitate provision or transfer of data 108 to system 112, by temporarily, i.e. not persistently, displaying data 108 in a bar code form 110 on display 104 of device 112.

Accordingly, system 108 having scanner 114 coupled to it, may acquire data 108, by having scanner 114 scans or reads data 108 displayed in bar code form 110. Scanner 114 outputs data signal corresponding to the bar code 110 read, and scanner device driver 116 in turn re-generates data 108 on system 112 in either analog or digital form, as system 112 is desirably configured.

Thus, under the present invention, data 108 may be provided to system 112 without requiring the conventional communication interfaces, such as serial or parallel interfaces, universal serial bus or IEEE 1394 bus interface. Further, data 108 is provided without requiring the user of device 102 to verbally provide the data 108 to an operator of system 102, who then manually enters data 108 into system 102.

Method

Figure 2:
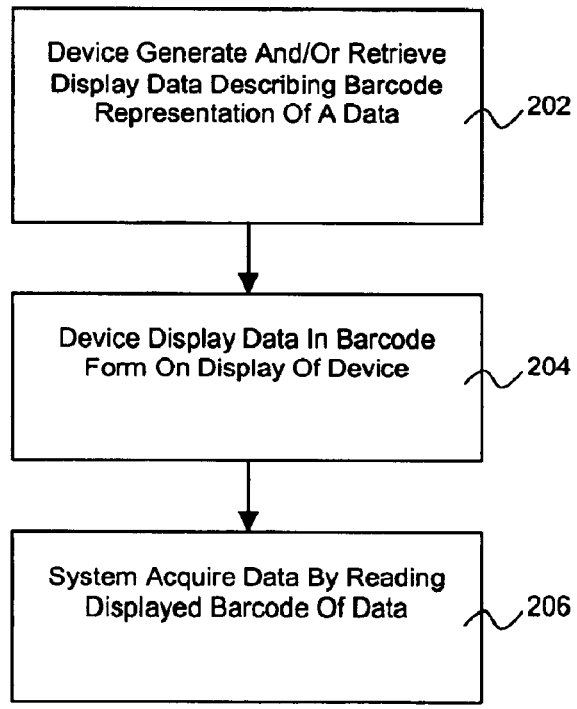
FIG. 2 illustrates a method view of the present invention, in accordance with one embodiment.

FIG. 2 illustrates a method view of the present invention, in accordance with one embodiment. As illustrated, device 102, on demand, either retrieves or dynamically generates the display data describing the bar code form 110 of a data 108, block 202. In the former case, the display data describing the bar code form 110 of a data 108 are pre-provided or pre-generated, whereas in the latter case, they are not. In an embodiment where the display data describing the bar code form 110 of a data 108 are pre-generated, the pre-generation is also performed by hardware/software features 106.

In block 204, hardware/software features 106, as described earlier, temporarily, i.e. non-persistently, display data 108 in bar code form 110 on display 104 of device 102 in accordance with the retrieved/dynamically generated display data describing the bar code 110.

In block 206, system 112, as described earlier, acquires data 108 by having scanner 114 scans and reads the displayed bar code form 110 of data 108, outputs corresponding scan signals, and scan device driver 116 reconstitutes data 108 on system 112 based on the scan output signals.

The display data describing the bar code form 110 of data 108, and therefore, the generation of such display data, as well as the subsequent regeneration of data 108 on system 112 based on the scan output signals, are all bar code language dependent.

Bar Code Language

The bar code language may be any one of a number of the bar code languages known in the art or to be developed. For examples, the bar code language may be, but not necessarily, UPC-A or UPC-E
EAN
Code 3 of 9
Interleaved 2 of 5
Code 128
UCC/EAN-128
Codabar
PostNet
Pharmacode
PDF-417

The UPC-A bar code language is designed to encode numbers with a fixed length of 12 digits. The twelfth digit is a calculated check digit computed from the eleven prior digits. It is widely used for product identification in the retail industry in U.S.

UPC-E is similar to UPC-A, except it is designed to encode numbers with a fixed length of 8 digits only.

EAN is also similar to UPC-A, except it is designed to encode numbers with a fixed length of 13 digits. It is widely used for product identification in the retail industry outside U.S.

Code 3 of 9 (also referred to as Code 39) is designed to represent alphanumeric characters of varying length. The asterisk (*) character is used as the character sequence start/stop character.

Interleaved ⅖ is a high density encoding scheme, also designed to encode alphanumeric characters of variable length. However, only an even number of numeric data can be encoded within this symbol. The "double density" symbol encodes odd positioned data in the bars, and even positioned data in the spaces.

Code 128 is a very compact and versatile language designed to encode the entire 128 ASCII character set. The language is designed to be self-checking, and includes geometric features to improve scanner performance.

UCC/EAN-128 is an extension of Code 128, further including a special character (function 1) as part of the start code. In addition, UCC/EAN-128 utilizes standardized application identifiers.

Codabar is designed to encode 16 alphanumeric characters,:0–9 and 6 special characters (–$:/.+). The language also includes self-checking features.

Postnet is designed by the US Postal Service to encode ZIP code information on letter mail. The language differs from most other languages in that the individual bar code height alternates, rather than the bar width.

Pharmacode is designed to encode numeric data with values ranging from 1–8190. It is primarily used in packing control systems.

The PDF-417 is a high density encoding scheme, employing two dimensional bar codes consisting essentially of stacked lower bar code sets. PDF-417 is capable of encoding all 255 ASCII characters.

These languages, including generation of display data describing an encoding for an alphanumeric character, as well as the regeneration of the alphanumeric character from scan signals are known, accordingly, will not be further described.

Overview Revisited

Referring to FIG. 1 again, data 108 may be any alpha and/or numeric data including, but are not limited to, first names, middle names, last names, street names, city names, state names, country names, organization names, organization unit names, product names, item names, zip codes, phone numbers, driver's license numbers, passport numbers, social security numbers, student ID numbers, product identifiers, birthdates, and so forth.

As to display 104 of device 102, it is of a type that supports columnar displays. Preferably, display 104 also supports columnar displays of variable heights, thus supporting a full range of bar code languages where the alpha and/or numeric characters may be encoded through the thickness and/or heights of the bars. The "thickness" of a bar of bar code 110 is controlled through the number of columns employed to display the bar, whereas the "height" of a bar is controlled through the "height" of the column.

In a display comprising an array of pixels, the latter is controlled through the number of pixels employed in a column. The size of the array is application dependent, or more specifically, bar code language dependent. If only the relative simple bar code languages are supported, display 102 may include a relatively small array of pixels with relatively coarse display granularity. However, if the more complex bar code languages are supported, display 102 should include an array of pixels capable of providing the display granularity required.

Preferably, display 102 is of a type that is capable of supporting relatively jitter free and/or flicker free displays.

Examples of displays suitable for use to practice the present invention include, but are not limited to, dot-matrix displays, TFT active matrix displays, and other displays of the like.

Except for the requirement of a display that is commensurate with the complexity of the bar code language supported, and the ability to incorporate hardware/software features 106, device 102 may otherwise be any one of a number of apparatuses known in the art.

While it is anticipated that the present invention is particularly desirable for mobile devices, the present invention is not so limited. Device 102 may be a mobile device, such as a pager, a PDA, a wireless mobile phone, or a relatively immobile device, such as a desktop computer, or a laptop computer ("immobile" from the perspective of scanning the display bar code).

In the former case, i.e. where device 102 is a relative mobile device, scanner 114 may be a stationery scanner, such as those commonly found at the checkout stands of a grocery store. Typically, reading of the non-persistently displayed bar code 110 of data 108 by system 112 is made possible by moving device 102 (with bar code 110 displayed) over scanner 114.

In the latter case, i.e. where device 102 is a relative immobile device, scanner 114 may be a mobile scanner, such as those commonly found at the checkout stands of a clothing department store or in a file room of an office. Typically, reading of the non-persistently displayed bar code 110 of data 108 by system 112 is done by moving scanner 114 over device 102 with bar code 110 displayed.

A Hardware Implementation

Figure 3:
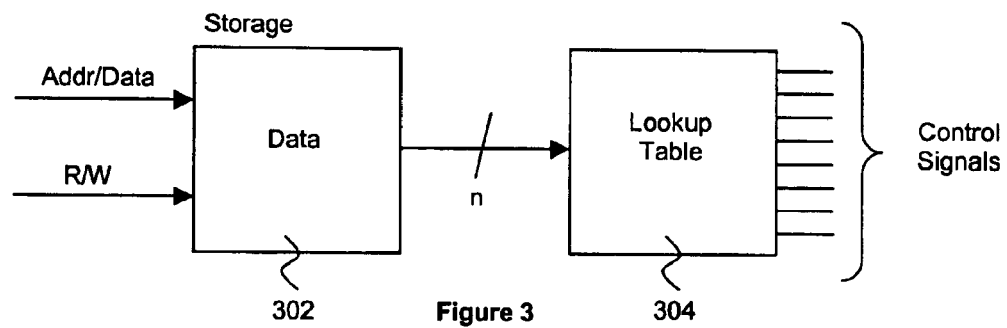
FIG. 3 illustrates the relevant hardware elements of the device of FIG. 1 in further details, in accordance with one embodiment.

FIG. 3 illustrates the relevant elements of a hardware implementation of features 106, in accordance with one embodiment. As illustrated, for the embodiment, the relevant elements include persistent store 302 and lookup table 304 coupled to each other as shown. Persistent store 302 is employed to store data 108, whereas lookup table 304 is employed to store the corresponding control signals for controlling a sub-array of pixels of display 104 to effectuate the display of a bar code.

The number of control signals required is dependent on the size of the sub-array, and the amount of column as well as row controls that need to be exercised. For example, if 3 fixed height columns are employed to encode hexadecimals, 3-bits, 000, 001, 010 and so forth, would be sufficient to control a sub-array of 3 columns of fixed height pixels.

For the embodiment, as the address and read/write control signals are applied to persistent store 302 to select one of the stored data 108, persistent store 302 outputs the selected data accordingly. Depending on the bar code language supported, the selected data 108 may be outputted as a single binary value (e.g. in the case of Pharmacode, where the selected data may be a value between 1–8190), or as a series of data bytes (e.g. in the case of Code 128, where each data byte corresponds to an ASCII code).

The binary value or each of the individual data bytes is applied to lookup table 304. In response, lookup table 304 outputs the appropriate control signals to control a "current" sub-array of pixels of display 104 to effectuate the display of a bar code.

Persistent store 302 may be a dedicated store for practicing the present invention, or may be a shared store, shared with other functions of device 102. In one embodiment, persistent store 302 and lookup table 304 are implemented using a field programmable gate array (FPGA), with the embedded memory resources of the FPGA implementing persistent store 302 and the configurable logic resources of the FPGA configured to responsive output the appropriate display control signals for one or more bar code languages. An example of one such FPGA suitable for use to practice the present invention is the Virtex™ Series of FPGA, available from Xilinx Corporation of San Jose, Calif.

In various embodiments, the above described hardware implementation of feature 106 is complemented with various display related electronic components that enable the displays to be rendered in a relatively jitter and/or flicker free manner, to improve the displays' "readability" by the scanners. These jitter and/or flicker reduction components are known in the art; accordingly will not be further described.

A Hardware/Software Implementation

Figure 4:
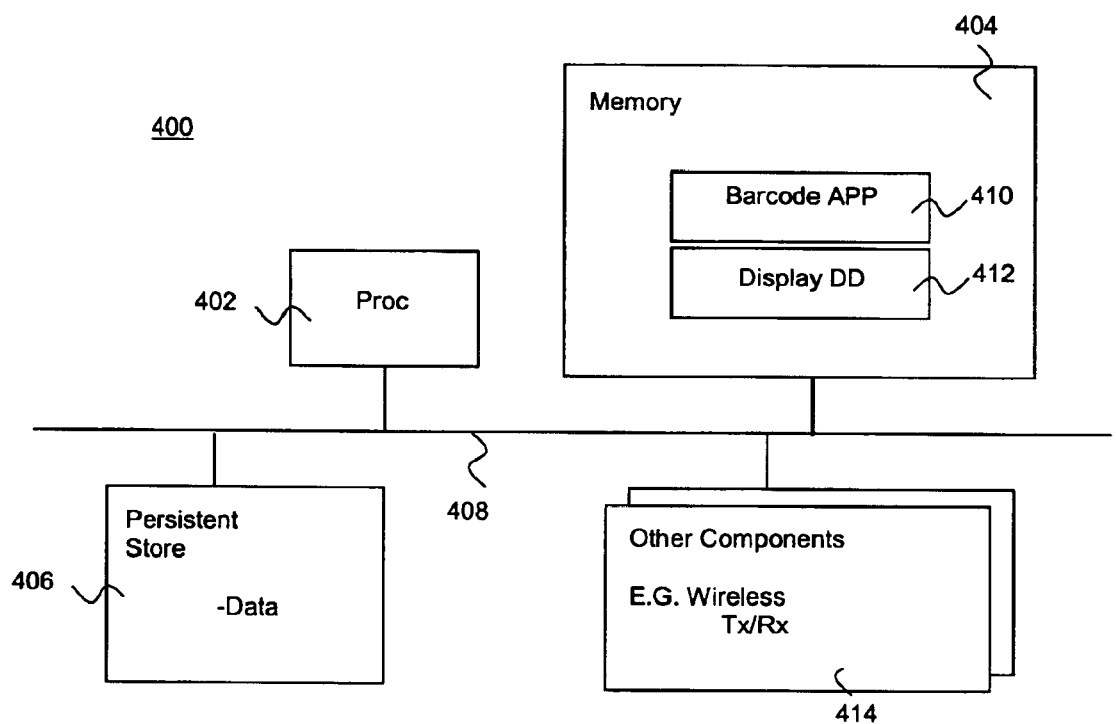
FIG. 4 illustrates the relevant hardware and software elements of the device of FIG. 1 in further details, in accordance with another embodiment.

FIG. 4 illustrates the relevant elements of a hardware and software implementation of features 106, in accordance with one embodiment. As illustrated, for the embodiment, feature 106 includes processor 402, memory 404 and persistent store 406 coupled to each other via bus 408. Display 104 (not shown in FIG. 4) and processor 402 are also coupled to each other via bus 408.

As before, persistent store 406 is employed to store data 108. Persistent store may be a EEPROM (or like kind variants, such as a Flash Memory, a Memory Stick), a magnetic or optical disk drive, a CDROM, a DVD drive and so forth.

Memory 404 may be any SDRAM, DDRAM or other high speed volatile as way as non-volatile storage devices known in the art. Memory 404 is employed to store software module 410 and display device driver 412. Software module 410 is equipped with logic to request display device driver 412 to render corresponding bar code displays at locations on display 104 appropriate for an alpha or numeric part of data 108. Display device driver 412 in turn outputs the appropriate control signals to control display 104.

Processor 402 is employed to execute software module 410 and display device driver 412, as well as other programming instructions of device 102.

Except for software module 410 and the manner the various elements of FIG. 4 are used to practice the present invention, the other illustrated elements are known in the art, and accordingly will not be further described. One embodiment of software module 410 will be further described later, referencing FIGS. 6–7.

As with the earlier described hardware implementation, processor 402, memory 404, persistent store 406 and bus 408 may be dedicated elements of device 102, dedicated to the implementation of features 106, or shared elements, shared with other functions of device 102.

Figure 5A:
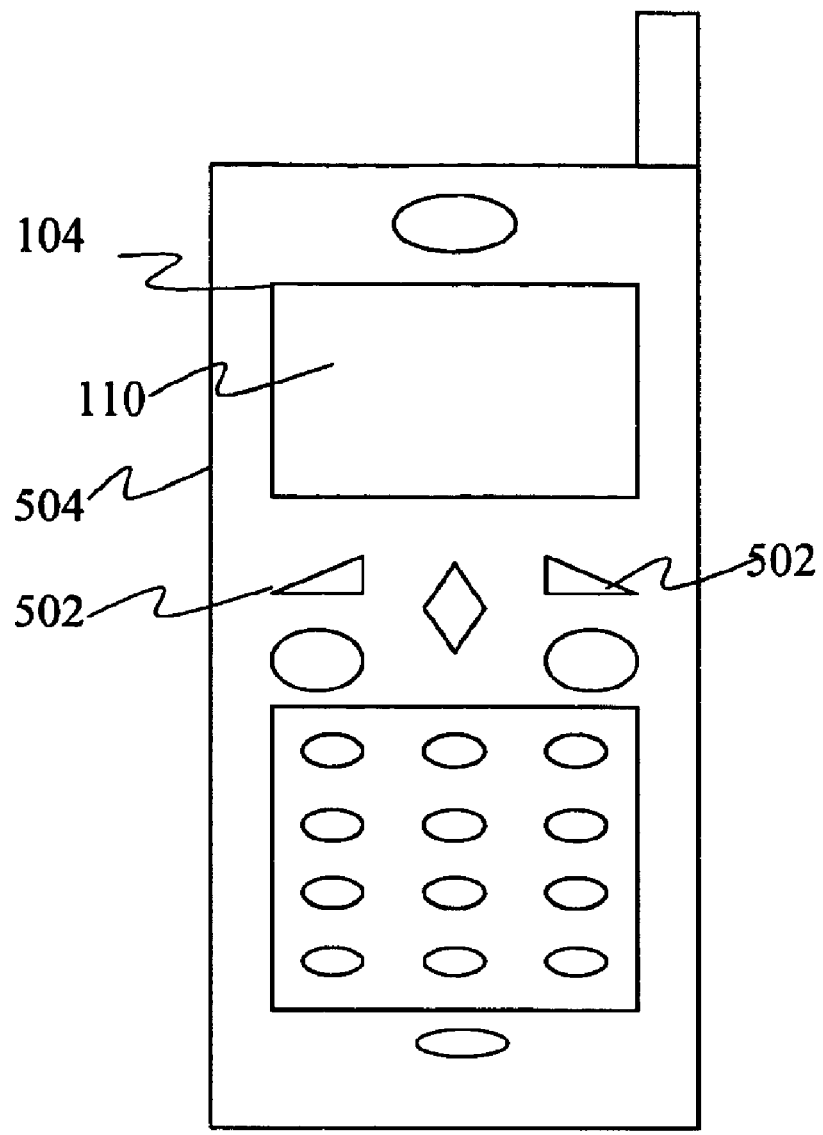
FIGS. 5a–5b illustrate two front views of two hand held embodiments of the device of FIG. 1.
Figure 5B:
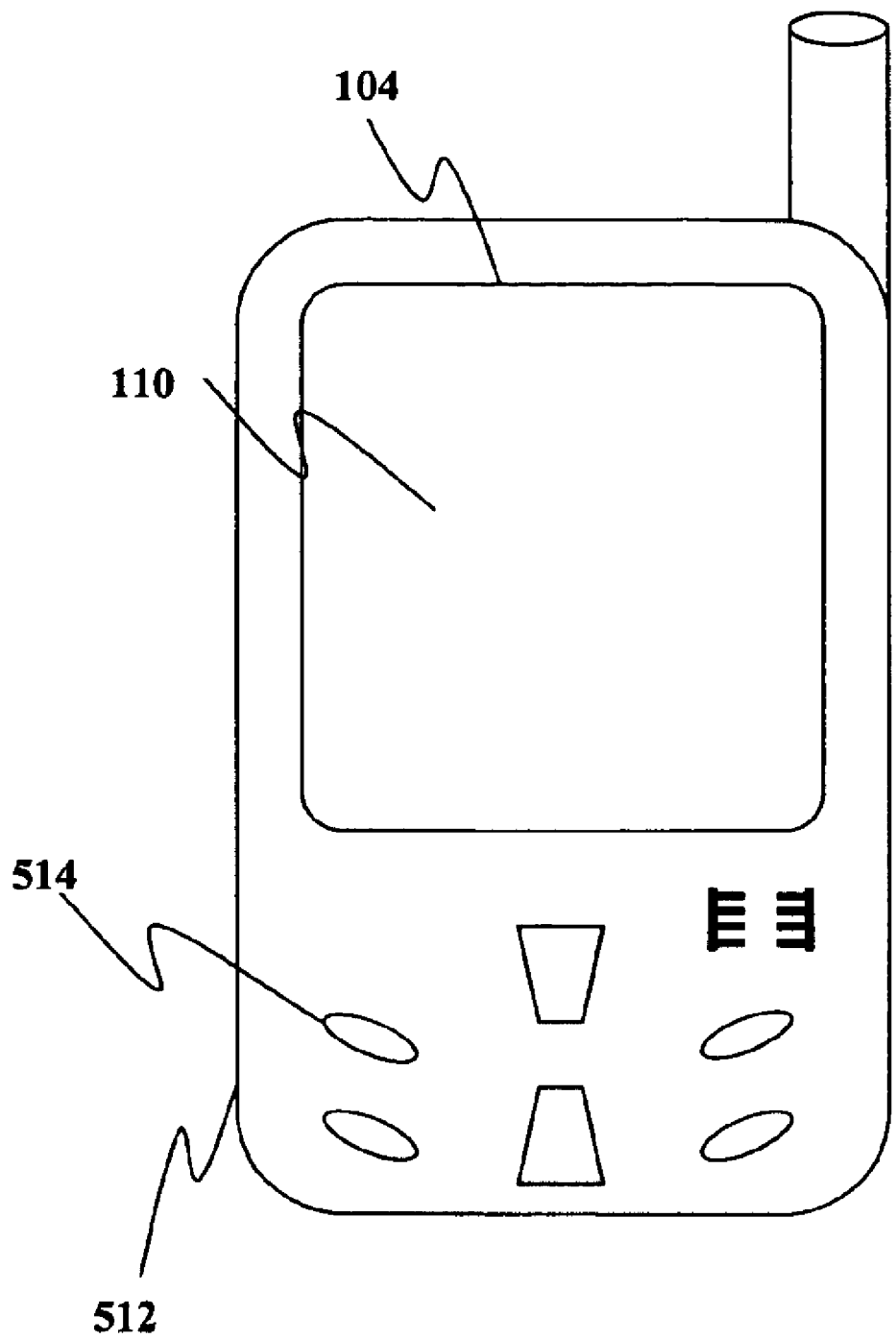

In one embodiment, the elements are shared elements, and device 102 is a PDA, a perspective view of which, with bar code 110 of a data 108 displayed on its display 104, is illustrated in FIG. 5b. PDA 102 includes a palm sized body 512 and control buttons 514, whose usage will be described later.

In other embodiments, the elements are shared elements, and device 102 is a wireless mobile telephone, further including at least an antenna and a wireless transceiver (not shown). A perspective view of which, with bar code 110 of a data 108 displayed on its display 104, is illustrated in FIG. 5b. Wireless mobile phone 102 includes also a palm sized body 502 and control button 504, whose usage will also be described later.

In yet other embodiments, wireless telephone 102 further includes one or more radio tuners. A wireless telephone including at least dual radio tuners with one tuner tuning to a current broadcast, and another tuner seeking another broadast in accordance with certain seek criteria is the subject of Patent Treaty Cooperation Application number PCT/US02/14872, filed May 10, 2002, having at least partial common inventorship, and assigned to the common assignee of the present invention. For these embodiments, data 108 may include a product identifier of a recorded song, or a product identifier of a product that is the subject of an included advertisement.

In other words, the present invention may be advantageously employ by a user to conveniently acquire additional information, such as pricing and/or availability information of an item, using its captured identification.

In yet other embodiments, wireless telephone 102 includes a snap-on "intelligent" cover having an embedded electronic component (such as a SIM chip) with content for personalizing the phone. In some of these embodiments, the snap-on "intelligent" cover includes a see through area to enable displays rendered on display 104, such as bar code displays, remain visible. In others of these embodiments, the snap-on "intelligent" cover includes display 104. Personalizing mobile devices, including wireless telephones, through "intelligent" covers is the subject matter of co-pending U.S. application Ser. No. 10/087,098, filed Mar. 1, 2002, entitled "Personalizing Electronic Devices and Smart Covering".

In various embodiments, the above described hardware and software implementation of feature 106 is complemented with various display related electronic components that enable the displays to be rendered in a relatively jitter and/or flicker free manner, to improve the displays' "readability" by the scanners. These jitter and/or flicker reduction components are known in the art; accordingly will not be further described.

Software Module

Figure 6:
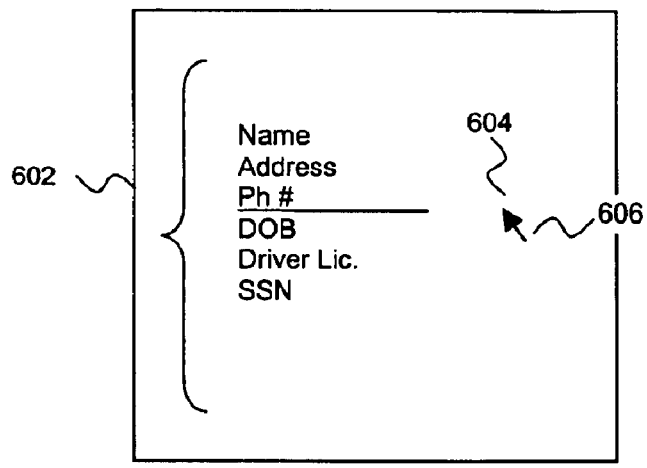
FIG. 6 illustrates an example snippet of an end user interface of the software module of FIG. 4, suitable for use to practice the present invention, in accordance with one embodiment.
Figure 7:
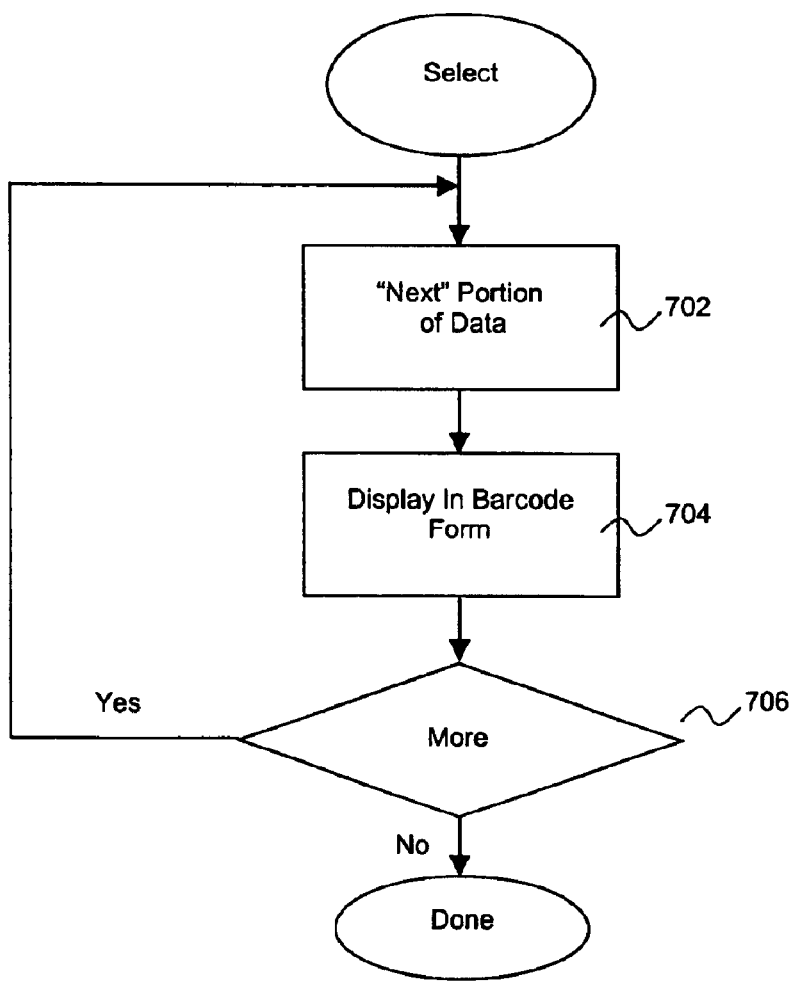
FIG. 7 illustrates the operational flow of the relevant aspects of the software module of FIG. 4, in accordance with one embodiment.

FIGS. 6–7 illustrate a relevant snippet of an end user interface, and the operational flow of the relevant aspects of software module 410 respectively, in accordance with one embodiment. Before describing these relevant aspects, it should be noted that while for ease of understanding, software module 410 is referred to "singularly", in practice, software module 410 may be implemented via one or more routines.

For the embodiment illustrated in FIG. 6, software module 410 supports a scrollable list 602 of data 108 to facilitate a user of device 102 in selecting a particular data 108 for display in bar code form 110 on display 104. The interface includes cursor 606 for identification of a listed item for selection, and highlighting to denote the selected data 108. Movement of cursor 606 and selection of the item pointed to by cursor 606 may e.g. be controlled and denoted using control buttons (e.g. control buttons 504 of wireless mobile phone 102 of FIG. 5a or control buttons 514 of PDA 102 of FIG. 5b).

Operationally, as illustrated by FIG. 7, upon receipt of notification of a selection by a user (e.g. from the underlying operating system services of device 102), software module 410 proceeds to process the "next" portion of the selected data, block 702. The "next" portion of the selected data may e.g. a part of a social security number, a part of a telephone number, a part of an address, and so forth. As described earlier, software module 410 either retrieves the pre-generated display data describing the corresponding bar codes, or dynamically generates the display data, and then non-persistently displays the corresponding bar codes using the retrieved or dynamically generated display data, block 704.

Thereafter, software module 410 determines if all parts of the selected data 108 have been rendered, block 706. If not, the process continues back at block 702, otherwise, the process terminates.

For the above described embodiment, the display of the bar code of the "next" portion of the selected data 108 may be made adjacent to the previously displayed bar code of the "previous" portion, or in lieu of the previously display bar code of the "previous" portion, depending on display 104 and the nature of the selected data 108.

For example, in one embodiment, software module 410 may process and generate the corresponding bar codes for a telephone number in 3 parts successively, the area code, the prefix and the last 4 numbers. Each of the successive displays of the bar codes are "append" to the prior displays forming the whole telephone number. However, the successive display of a bar code for a second address line may replace the earlier display of a first address line instead, thereby allowing a selected data 108 to be conveyed through a series of successive non-persistently displayed bar codes 110.

Conclusion and Epilogue

Thus, it can be seen from the above descriptions, a novel non-persistently displayed bar code based data input method has been described. The present invention advantageously improved the ease of use for a user to provide data captured in a device to another system, especially for data captured in e.g. a mobile device.

While the present invention has been described in terms of the above described embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A data provision method comprising:

facilitating a user of a wireless mobile phone in selecting one of a plurality of personal data stored in the wireless mobile phone;

in response, non-persistently displaying the selected personal data in a bar code form on a display of the wireless mobile phone, for acquisition into a system of a recipient by optically scanning said non-persistently displayed personal data in said bar code form, said non-persistently displaying including:

non-persistently displaying a first portion of the selected personal data on the display of the wireless mobile phone, in bar code form, for a period of time; and non-persistently displaying a second portion of the selected data on the display of the wireless mobile phone, in bar code form, automatically thereafter.

2. The method of claim 1, wherein said selected personal data comprises a selected one of one or more numbers and one or more characters.

3. The method of claim 1, wherein said personal data comprises at least a selected one of a zip code, a date of birth, a social security number, a telephone number and a credit card number of the user of the wireless mobile phone.

4. The method of claim 1, wherein said personal data comprises at least a selected one of a first name, a middle name, a last name, a street name, a city name, a state name, a country name, an organization name, and an organizational unit name of the user of the wireless mobile phone.

5. The method of claim 1, wherein said personal data comprises a selected one of a personal identifier, a driver's license identifier, a passport identifier, an employee identifier, and a student identifier of the user of the wireless mobile phone.

6. The method of claim 1, wherein said bar code form is expressed in accordance with a selected one of UPC-A, UPC-E, EAN, Code 3 of 9, Interleaved 2 of 5, Code 128, UCC/EAN-128, Codabar, PostNet, Pharmacode, and PDF-417.

7. The method of claim 1, wherein the method further comprises retrieving a pre-generated set of display data corresponding to said selected personal data, with said pre-generated set of display data having display data describing said bar code form of said selected personal data.

8. The method of claim 1, wherein the method further comprises:

dynamically generating in real time display data describing said bar code form of said selected personal data.

9. The method of claim 1, wherein the method further comprises re-generating said acquired personal data on said system in a selected one of a digital representation and an analog representation.

10. The method of claim 1, wherein the method further comprises moving said wireless mobile phone over a stationery scanner.

11. The method of claim 1, wherein the method further comprises moving a scanner over said wireless mobile phone.

12. A wireless mobile phone apparatus comprising:

an antenna;

wireless telephony circuitry coupled to the antenna;

first storage medium to store a plurality of personal data of a user of the wireless mobile phone apparatus;

a display;

means to facilitate the user in selecting one of the stored personal data of the user of the wireless mobile phone apparatus, and to render, in response, on the display the selected personal data in bar code form including rendering a first portion of the selected personal data in bar code form for a period of time, and automatically rendering thereafter, a second portion of the selected personal data in bar code; and a palm-sized body encasing said wireless telephony circuitry, said first storage medium, and said means.

13. The apparatus of claim 12, wherein the display comprises an array of pixels selectable for multiple columnar displays.

14. The apparatus of claim 12, wherein the display comprises a matrix display.

15. The apparatus of claim 12, wherein said means comprises circuitry coupled to the display to output a plurality of display signals to control display states of a plurality of pixels of the display responsive to a plurality of input signals.

16. The apparatus of claim 12, wherein said means comprises:

second storage medium having stored therein a plurality of instructions designed to display said selected personal data on said display in said bar code form; and a processor coupled to said second storage medium to execute said instructions.

17. The apparatus of claim 16, wherein said instructions are further designed to retrieve a pre-generated set of display data describing said bar code form of said selected personal data.

18. The apparatus of claim 16, wherein said instructions are further designed to generate display data describing said bar code form of said selected personal data.

19. The apparatus of claim 16, wherein said instructions are designed to display on said display, a first portion of the selected personal data in bar code form for a period of time, and automatically display on said display thereafter, a second portion of the selected personal data in bar code.

20. The apparatus of claim 12, wherein said selected personal data comprises a selected one of one or more numbers and one or more characters.

21. The apparatus of claim 12, wherein said personal data comprises a selected one of a zip code, a date of birth, a social security number, a telephone number and a credit card number of the user of the wireless mobile phone.

22. The apparatus of claim 12, wherein said personal data comprises a selected one of a first name, a middle name, a last name, a street name, a city name, a state name, a country name, an organization name, and an organizational unit name of the user of the wireless mobile phone apparatus.

23. The apparatus of claim 12, wherein said personal data comprises a selected one of a personal identifier, a driver's license identifier, a passport identifier, an employee identifier, and a student identifier of the user of the wireless mobile phone apparatus.

24. The apparatus of claim 12, wherein said bar code form is expressed in accordance with a selected one of UPC-A, UPC-E, EAN, Code 3 of 9, Interleaved 2 of 5, Code 128, UCO/EAN-128, Codabar, PostNet, Pharmacode, and PDF-417.

25. The apparatus of claim 12, wherein said display is disposed on said palm-sized body.

26. The apparatus of claim 12, wherein said apparatus further comprises an interchangeable cover to cover said palm-sized body, and the display is disposed on the interchangeable cover.

* * * * *